(12) United States Patent
Kobayashi et al.

(10) Patent No.: US 8,163,848 B2
(45) Date of Patent: Apr. 24, 2012

(54) ANTISTATIC POLY(HYDROXYALKANOIC ACID) COMPOSITIONS

(75) Inventors: Toshikazu Kobayashi, Chadds Ford, PA (US); Barbara Ann Wood, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 246 days.

(21) Appl. No.: 12/434,335

(22) Filed: May 1, 2009

(65) Prior Publication Data

US 2010/0280193 A1    Nov. 4, 2010

(51) Int. Cl.
  *C08L 53/00* (2006.01)
  *C08L 67/00* (2006.01)
(52) U.S. Cl. .......................................... 525/404; 525/421
(58) Field of Classification Search ................ 525/92 R, 525/92 A, 92 B, 92 F, 92 H, 93, 404, 421
See application file for complete search history.

(56) References Cited

U.S. PATENT DOCUMENTS

| | | | |
|---|---|---|---|
| 5,378,801 A | 1/1995 | Reichert | |
| 5,652,326 A | 7/1997 | Ueda et al. | |
| 5,863,466 A | 1/1999 | Mor | |
| 6,268,030 B1 | 7/2001 | Zhang | |
| 7,268,190 B2 | 9/2007 | Ohme | |
| 7,381,772 B2 | 6/2008 | Flexman | |
| 2005/0049360 A1 | 3/2005 | Okamoto | |
| 2007/0213466 A1 | 9/2007 | Uradnisheck | |
| 2007/0255013 A1 | 11/2007 | Becraft | |
| 2008/0027178 A1 | 1/2008 | Uradnisheck | |
| 2009/0096134 A1* | 4/2009 | Holman et al. | 264/402 |
| 2009/0171023 A1* | 7/2009 | Mawatari et al. | 525/93 |
| 2009/0209695 A1* | 8/2009 | Yu et al. | 524/451 |

FOREIGN PATENT DOCUMENTS

| | | |
|---|---|---|
| EP | 2048200 A1 | 4/2009 |
| JP | 61044646 A | 3/1986 |
| JP | 07-026001 A | 1/1995 |
| JP | 07-053684 A | 2/1995 |
| JP | 09-12844 A | 2/1997 |
| JP | 09-316310 A | 12/1997 |
| JP | 10-193495 A | 7/1998 |
| JP | 10193495 A | 7/1998 |
| JP | 2006-131798 A | 5/2006 |
| JP | 2009007520 A | 1/2009 |
| WO | 2007127303 A1 | 11/2007 |
| WO | WO 2008012946 * | 1/2008 |
| WO | 2008078413 A1 | 7/2008 |

* cited by examiner

*Primary Examiner* — Jeffrey Mullis
(74) *Attorney, Agent, or Firm* — Lucas K. Shay

(57) ABSTRACT

Disclosed are toughened, antistatic resin composition and an article comprising the composition wherein the composition comprises or consists essentially of poly(hydroxyalkanoic acid), such as polylactic acid; an impact modifier comprising an ethylene copolymer; and an ion conducting polymer.

20 Claims, No Drawings

ANTISTATIC POLY(HYDROXYALKANOIC ACID) COMPOSITIONS

The invention relates to thermoplastic poly(hydroxyalkanoic acid) compositions with antistatic properties.

BACKGROUND OF THE INVENTION

Poly(hydroxyalkanoic acid) (PHA) polymers such as poly(lactic acid) (PLA) may be polymerized from renewable sources rather than petroleum and are compostable. They have a broad range of industrial and biomedical applications. However, physical limitations such as brittleness and slow crystallization may prevent easy injection molding of PHAs into articles that have an acceptable degree of toughness for many applications. Extruded amorphous sheeting may also be too brittle for handling in continuous moving equipment without breakage.

Modifiers for PHAs allow PHA compositions to be easily melt-processed into a variety of articles with an acceptable level of toughness are known. See, e.g., JP09-316310A (PLA composition comprising modified olefin compounds), U.S. Pat. Nos. 7,268,190 and 7,381,772 and US patent applications 2007/0213466 and 2008/0027178 (PHA compositions toughened with ethylene ester copolymers containing glycidyl groups such as ethylene/butyl acrylate/glycidyl methacrylate), JP09-12844 (polyester composition composed of polyether ester amide and a modified vinyl polymer), WO2007127303 (blend comprising PLA and at least 5 weight % of ethylene/unsaturated ester copolymer having an unsaturated ester comonomer content of at least about 30, modified ethylene/unsaturated ester copolymer, polyetheramide block copolymer; propylene/ethylene copolymer comprising, or styrenic block copolymer), and WO2008078413 (a biodegradable polyester composition obtained by melt-mixing a biodegradable polyester containing not less than 70% by mole of an α- and/or β-hydroxycarboxylic acid unit, a polyether/olefin block copolymer resin or a polyether ester amide copolymer resin, a (meth)acrylate compound, and a peroxide).

A fabricated article made from a polymeric material may become statically charged, and the surface may attract and hold charged particles such as dust in the air. In some cases an article may become damaged and/or otherwise devalued by the adhesion of electrostatically charged species. In other cases, such as in the packaging of powders, the powder may adhere to the packaging material. In addition to electrostatic adhesion, the buildup of excessive static charge on articles may result in damage to the article and/or its surroundings due to sparks and other rapid electrostatic discharges.

To prevent adhesion of charged particles, various approaches for preventing surface static charge buildup have been disclosed. For example, an antistatic agent or an antistatic polymer may be applied to the surface, or diffuse from the bulk composition to the surface, of an article as a way of preventing build-up of static charge on an article. See, for example, JP02-28919B, JP61-44646A, and JP10-193495A.

Use of surface-applied antistatic agents may introduce potential contamination of materials that come in contact with the surface-applied antistatic agent. Other drawbacks include situations wherein the applied film is inadequate in mechanical properties and could be easily damaged, has poor water resistance, or becomes tacky due to absorption of water. Attempts have been made to provide an antistatic polymer layer not as a surface layer, but as an inner layer with another polymer layer on the surface of the material.

Alternatively, antistatic agents may be incorporated into the composition of a molded article. However, materials that come in contact with the composition may become contaminated due to bleeding of the antistatic agent out of the composition and/or the antistatic effect may deteriorate with time. Incorporation of a low-molecular ionic surfactant such as an alkylsulfonic acid salt or an alkylbenzenesulfonic acid salt into a polymer is known as an internal addition process. However, surfactants may degrade the PHA resin.

"Permanent", non-diffusing antistatic agents avoid many of these problems. High molecular weight or polymeric antistatic materials have been developed to provide permanent antistatic agents. For example, a composition comprising thermoplastic polyurethane, a thermoplastic polyester (the polyester is a polylactone), and a quaternary ammonium compound is disclosed (e.g., U.S. Pat. No. 5,863,466).

Permanent antistatic agents include "inherently dissipative polymers". Polyether ester amides are known to promote antistaticity. However, using polyether ester amides as modifiers of other thermoplastic resins may cause laminar peeling and the production of a molded article having desirable mechanical properties may difficult because of incompatibility.

A composition has been disclosed which comprises (A) a thermoplastic polymer and (B) an antistatic agent wherein a refractive index difference between (A) and (B) is not more than 0.02 (e.g., US 2005/0049360). See also U.S. Pat. No. 6,268,030 (a composition composed of polytetramethylene terephthalate, polyether ester amide, an alkaline metal and a modified polyolefin) and JP2006-131798 (PLA-based composition comprising PLA, a polyetheresteramide polymer and/or a block polymer having a structure in which a polyolefin block and a block of a polymer containing a polyoxyethylene chain are mutually bonded repeatedly).

It is desirable to provide toughened PLA compositions with good antistatic properties.

SUMMARY OF THE INVENTION

The invention provides a PHA composition comprising, consisting essentially of, or produced from, based on the weight of the composition, about 40 to about 94% of PHA, about 3 to about 30% of an impact modifier, and about 3 to about 30% of an ion conductive polymer wherein the impact modifier can comprise, consist essentially of, or be an ethylene copolymer derived from copolymerizing (a) about 20 to about 98 weight % ethylene, (b) 0 to about 25 weight % of one or more olefins of the formula $CH_2=C(R^1)CO_2R^2$, (c) 0 to about 70 weight % of one or more olefins of the formula $CH_2=C(R^3)CO_2R^4$, (d) 0 to about 70 weight % of one or more olefins of the formula $CH_2=CH-OCOR^5$, and (e) 0 to about 20 weight % of carbon monoxide, where $R^1$ is hydrogen or an alkyl group with 1 to 6 carbon atoms, $R^2$ is glycidyl, $R^3$ is hydrogen or an alkyl group with 1 to 8 carbon atoms, $R^4$ is an alkyl group with 1 to 8 carbon atoms, $R^5$ is an alkyl group with 1 to 6 carbon atoms; and the weight % of ethylene, $CH_2=C(R^1)CO_2R^2$, $CH_2=C(R^3)CO_2R^4$ $CH_2=C-OCOR^5$ and carbon monoxide is based on the total weight of total comonomers in the copolymer, provided that the amount of at least one of (b), (c), (d) or (e) in the copolymer is not 0; and the ion conductive polymer can be selected from the group consisting of polyamide/polyether block amides, polyether block amides, and polyether ester amides, each comprising 10 to 5000 ppm by weight based on the ion conductive polymer of an alkali metal or alkaline earth metal as a compound or salt.

DETAILED DESCRIPTION OF THE INVENTION

All references disclosed herein are incorporated by reference.

"Copolymer" means polymers containing two or more different monomers. The terms "dipolymer" and "terpolymer" mean polymers containing only two and three different monomers respectively. The phrase "copolymer of various monomers" means a copolymer whose units are derived from the various monomers.

Compostable polymers are those that are degradable under composting conditions. They break down under the action of organisms (annelids) and microorganisms (bacteria, fungi, algae), achieve total mineralization (conversion into carbon dioxide, methane, water, inorganic compounds or biomass under aerobic conditions) at a high rate and are compatible with the composting process.

Biodegradable polymers are those that are capable of undergoing decomposition into carbon dioxide, methane, water, inorganic compounds or biomass in which the predominant mechanism is the enzymatic action of microorganisms that can be measured by standardized tests, in a specified time, reflecting available disposal conditions.

Renewable polymers are those that comprise or are prepared from raw or starting materials that are or can be replenished sooner than within a few years (unlike petroleum which requires thousands or millions of years), such as by fermentation and other processes that convert biological materials into feedstock or into the final renewable polymer.

PHA polymers are biodegradable polymers. A number of these are also available from processing renewable resources, such as production by bacterial fermentation processes or isolated from plant matter that include corn, sweet potatoes, and the like.

The invention discovers PHA composition exhibiting synergistic antistatic performance by the combination of ethylene copolymer tougheners and the antistatic agent. The antistatic performance in combination with high toughening provides a poly(hydroxyalkanoic acid) composition with performance that is not expected based on the performance of the poly(hydroxyalkanoic acid) combined with either the impact modifier or the antistatic agent separately.

PHA compositions include polymers prepared from polymerization of hydroxyalkanoic acids having from 2 to 7 (or more) carbon atoms, including the polymer comprising 6-hydroxyhexanoic acid, also known as polycaprolactone (PCL), and polymers comprising 3-hydroxyhexanoic acid, 4-hydroxyhexanoic acid and 3-hydroxyheptanoic acid. Of note are poly(hydroxyalkanoic acid) comprising hydroxyalkanoic acids having five or fewer carbon atoms, for example, polymers comprising glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid and 5-hydroxyvaleric acid. Notable polymers include poly(glycolic acid) (PGA), poly(lactic acid) (PLA) and poly(hydroxybutyrate) (PHB). PHA compositions also include blends of two or more PHA polymers, such as a blend of PHB and PCL.

PHA can be produced by bulk polymerization. A PHA may be synthesized through the dehydration-polycondensation of the hydroxyalkanoic acid. A PHA may also be synthesized through the dealcoholization-polycondensation of an alkyl ester of polyglycolic acid or by ring-opening polymerization of a cyclic derivative such as the corresponding lactone or cyclic dimeric ester. The bulk polymerization is usually carried out by two production processes, i.e., a continuous process and a batch process. JP03-502115 discloses a process wherein bulk polymerization for cyclic esters is carried out in a twin-screw extruder. JP07-26001 discloses a process for the polymerization for biodegradable polymers, wherein a bimolecular cyclic ester of hydroxycarboxylic acid and one or more lactones are continuously fed to a continuous reaction apparatus having a static mixer for ring-opening polymerization. JP07-53684 discloses a process for the continuous polymerization for aliphatic polyesters, wherein a cyclic dimer of hydroxycarboxylic acid is fed together with a catalyst to an initial polymerization step, and then continuously fed to a subsequent polymerization step built up of a multiple screw kneader. U.S. Pat. Nos. 2,668,162 and 3,297,033 describe batch processes.

PHA polymers also include copolymers comprising more than one PHA, such as polyhydroxybutyrate-hydroxyvalerate (PHBN) copolymers and copolymers of glycolic acid and lactic acid (PGA/LA). Copolymers can be prepared by catalyzed copolymerization of a polyhydroxyalkanoic acid or derivative with one or more cyclic esters and/or dimeric cyclic esters. Such comonomers include glycolide (1,4-dioxane-2,5-dione), the dimeric cyclic ester of glycolic acid; lactide (3,6-dimethyl-1,4-dioxane-2,5-dione); α,α-dimethyl-β-propiolactone, the cyclic ester of 2,2-dimethyl-3-hydroxypropanoic acid; β-butyrolactone, the cyclic ester of 3-hydroxybutyric acid, δ-valerolactone, the cyclic ester of 5-hydroxypentanoic acid; ε-caprolactone, the cyclic ester of 6-hydroxyhexanoic acid, and the lactone of its methyl substituted derivatives, such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc., the cyclic ester of 12-hydroxydodecanoic acid, and 2-p-dioxanone, and the cyclic ester of 2-(2-hydroxyethyl)-glycolic acid.

PHA compositions also include copolymers of one or more PHA monomers or derivatives with other comonomers, including aliphatic and aromatic diacid and diol monomers such as succinic acid, adipic acid, and terephthalic acid and ethylene glycol, 1,3-propanediol, and 1,4-butanediol. Around 100 different monomers have been incorporated into PHA polymers.

PHA polymers and copolymers may also be made by living organisms or isolated from plant matter. Numerous microorganisms have the ability to accumulate intracellular reserves of PHA polymers. For example, the copolymer poly(3-hydroxybutyrate-co-3-hydroxyvalerate) (PHB/V) has been produced by fermentation of the bacterium *Ralstonia eutropha*. Fermentation and recovery processes for other PHA types have also been developed using a range of bacteria including *Azotobacter, Alcaligenes latus, Comamonas testosterone* and genetically engineered *E. coli* and *Klebsiella*. U.S. Pat. No. 6,323,010 discloses a number of PHA copolymers prepared from genetically modified organisms.

"Poly(hydroxyalkanoic acid)" refers to a polymer or composition comprising any homopolymer or copolymer comprising a hydroxyalkanoic acid and mixtures thereof, such as those homopolymers, copolymers and blends listed above. Likewise, when a specific hydroxyalkanoic acid is used in such a term, such as poly(glycolic acid), PLA or poly(hydroxybutyrate), the term includes homopolymers, copolymers or blends comprising the hydroxyalkanoic acid used in the term.

Glycolic acid is derived from sugar cane. Poly(glycolic acid) can be synthesized by the ring-opening polymerization of glycolide and is sometimes referred to as poly-glycolide.

PLA includes poly(lactic acid) homopolymers and copolymers of lactic acid and other monomers containing at least 50 mole % of units derived from lactic acid or its derivatives and mixtures thereof having a number average molecular weight of 3,000 to 1,000,000, 10,000 to 700,000, or 20,000 to 600,000. PLA may contain at least 70 mole % of units derived from (e.g. made by) lactic acid or its derivatives. The poly (lactic acid) homopolymers and copolymers can be derived from d-lactic acid, l-lactic acid, or a mixture thereof. A mixture of two or more PLA polymers can be used. PLA may be prepared by the catalyzed ring-opening polymerization of the dimeric cyclic ester of lactic acid, which is referred to as "lactide." As a result, PLA is also referred to as "polylactide."

Copolymers of lactic acid are typically prepared by catalyzed copolymerization of lactic acid, lactide or another lactic acid derivative with one or more cyclic esters and/or dimeric cyclic esters as described above.

The PHA may comprise up to about 90 weight % of the composition, based on the total amount of PHA, impact modifier and antistatic agent used. For example, the PHA may be present in a range from a lower limit of 40, 50, 60, or 70 to an upper limit of 75, 80, 85 90 or 94 weight %.

"Ethylene copolymer" refers to a polymer derived from (e.g. made from) copolymerization of ethylene and at least one additional monomer. The ethylene copolymer acts as an impact modifier or toughener to make the composition less brittle. The impact modifier may be present in about 3 or about 5 to about 10,15, 20, 25 or 30 weight % of the total composition.

The ethylene copolymer impact modifier comprises, or consists essentially of, at least one random polymer made by copolymerizing (a) ethylene with at least one of (b) one or more olefins of the formula $CH_2=C(R^1)CO_2R^2$, where $R^1$ is hydrogen or an alkyl group with 1 to 6 carbon atoms, such as methyl, and $R^2$ is glycidyl; (c) one or more olefins of the formula $CH_2=C(R^3)CO_2R^4$, where $R^3$ is hydrogen or an alkyl group with 1 to 8 carbon atoms and $R^4$ is an alkyl group with 1 to 8 carbon atoms, such as methyl, ethyl, or butyl; (d) one or more olefins of the formula $CH_2=CH-OCOR^5$ wherein $R^5$ is an alkyl group with 1 to 6 carbon atoms; or (e) carbon monoxide (CO) monomers. Repeat units derived from ethylene may comprise from a lower limit of about 20, 40 or 50 weight % to an upper limit of about 80, 90, 95 or 98 weight % of the total weight of the ethylene copolymer, such as 40 to 90 weight % or 50 to 80 weight % of the copolymer.

Repeat units derived from monomer (b), when present, may comprise from a lower limit of about 2, 3 or 10 weight % to an upper limit of about 17, 20, or 25 weight % of the total weight of the ethylene copolymer. An example of the ethylene copolymer, wherein the amount of (c), (d) and (e) is 0, is derived from copolymerizing ethylene and glycidyl methacrylate (EGMA).

Repeat units derived from monomer (c), when present, may comprise from a lower limit of about 3, 15 or 20 weight % to an upper limit of about 35, 40 or 70 weight % of the total weight of the ethylene copolymer. Preferably, monomers (c) may be butyl acrylates. One or more of n-butyl acrylate, tert-butyl acrylate, iso-butyl acrylate, and sec-butyl acrylate may be used. Alternatively, monomers (c) may be methyl acrylates. Examples of the ethylene copolymer, wherein the amount of (b), (d) and (e) is 0, include copolymers derived from copolymerizing ethylene and butyl acrylate (EBA) and copolymers derived from copolymerizing ethylene and methyl acrylate (EMA).

An example of the ethylene copolymer is derived from ethylene, butyl acrylate, and glycidyl methacrylate (the amount of (d) and (e) is 0) (EBAGMA).

The impact modifier may comprise one or more copolymers of ethylene and a vinyl ester such as vinyl acetate. Repeat units derived from monomer (d), when present, may comprise from a lower limit of about 3, 15 or 20 weight % to an upper limit of about 35, 40 or 70 weight % of the total weight of the ethylene copolymer. An example of the ethylene copolymer, wherein the amount of (b), (c) and (e) is 0, is derived from copolymerizing ethylene and vinyl acetate (EVA).

When present, repeat units derived from carbon monoxide (monomer (e)) may comprise from a lower limit of about 3 weight % to an upper limit of about 15 or 20 weight % of the total weight of the ethylene copolymer.

An example of the ethylene copolymer is derived from ethylene, butyl acrylate, and carbon monoxide (the amount of (b) and (d) is 0) and may be referred to as EBACO. An example of the ethylene copolymer is derived from ethylene, vinyl acetate, and carbon monoxide (the amount of (b) and (c) is 0) and may be referred to as EVACO.

The ethylene copolymers used in the composition can be random copolymers that can be prepared by direct polymerization of the foregoing monomers in the presence of a free-radical polymerization initiator at elevated temperatures, about 100 to about 270° C. or about 130 to about 230° C., and at elevated pressures, at least about 70 MPa or about 140 to about 350 MPa. The ethylene copolymers may also be prepared using a tubular process, an autoclave, or a combination thereof, or other suitable processes. The ethylene copolymers may be not fully uniform in unit composition throughout the polymer chain due to imperfect mixing during polymerization or variable monomer concentrations during the course of the polymerization. The ethylene copolymers are not grafted or otherwise modified post-polymerization.

The impact modifier may comprise a mixture of the ethylene copolymers described above. For example, the impact modifier may comprise a combination of EGMA or EBAGMA copolymer and EBA, EMA or EVA copolymer. For example, an ethylene alkyl acrylate copolymer, such as an ethylene/methyl acrylate copolymer, may be present in about 1 to about 90 weight %, about 1 to about 50 weight %, about 5 to about 75 weight %, about 5 to about 40 weight %, about 10 to about 50 weight %, or about 10 to about 30 weight %, based on the total weight of the impact modifier, the remainder of the impact modifier being EGMA or EBAGMA.

Use of a mixture of ethylene copolymers may provide adequate toughening and antistatic performance (when combined with an antistatic agent described below) for some applications while minimizing the amount of more costly materials. For example, using an impact modifier comprising some EBA, EMA or EVA may allow the use of less EGMA or EBAGMA while still providing good levels of antistatic performance and toughening.

Permanent antistatic agents used in the composition include ion conducting polymers. By an ion conducting polymer is meant a polymer which is capable of conducting ions. The conductivity of such polymers requires that there be an ionic material present, such as an alkali metal salt which preferably is at least somewhat soluble in the polymer. Generally speaking, up to a point, the more ionic material present in the ion conducting polymer the higher its electrical conductivity will be. Such ion conducting polymers are used, for example, as additives in other thermoplastics to make these thermoplastics "antistatic".

The ion conducting polymer may be present in the composition from about 3 or about 5 to about 10, 15, 20, 25 or 30 weight % of the total composition.

The ion conducting polymer includes a polyamide/polyether block amide, polyether block amide, and/or polyether ester amide, wherein the antistatic performance is provided by the addition of alkaline metal. The alkaline metal is an element belonging to the group IA (alkali metals) or group IIA (alkaline earth metals) of the periodic table such as lithium, sodium, potassium, cesium, magnesium, calcium or combinations thereof, preferably an alkaline metal compound or salt, such as the corresponding halides, hydroxides, inorganic acid salts or organic acid salts such as acetate, carbonate and ammonium salts, or combinations thereof. Examples include lithium hydroxide, sodium hydroxide, potassium hydroxide, cesium hydroxide, magnesium hydroxide, calcium hydroxide; lithium acetate, sodium acetate, potassium acetate, magnesium acetate, calcium acetate; lithium carbonate, sodium carbonate, and potassium carbonate.

The amount of the alkaline metal compound or salt used in the antistatic composition is preferably 10 to 5000 ppm, more preferably 200 to 3,500 ppm based on the amount of polymer in the antistatic composition, such as polyether ester amide.

Commercially available ion conducting polymers include a polyamide/polyether block amide available under the tradename IRGASTAT P22 (Ciba Specialty Chemicals, Tarrytown, N.Y. 10591, U.S.A.) and polyether ester amides (PEEA) available under the tradename PELESTAT (Sanyo Chemical Industries, Ltd., Kyoto, Japan) in a variety of grades. Polyether block amides are available under the tradename PEBAX, such as grades MV1074 and MH1657 (Arkema, Inc., Philadelphia, Pa. 19103, USA).

The polyether ester amide is preferably a polyether ester amide derived from a polyamide having carboxyl groups on both terminals and a polyether component consisting of an ethylene oxide adduct of a bisphenol having high molecular weight, especially preferably a polyether ester amide derived from an ethylene oxide adduct of bisphenol having an ethylene oxide molar number of 30 to 60.

The polyamide having carboxyl groups at both terminals may be (1) a ring-opened lactam polymer, (2) a polycondensation product of an aminocarboxylic acid or (3) a polycondensation product of a dicarboxylic acid and a diamine. Examples of the lactam of the polymer (1) are caprolactam, enantholactam, laurolactam and undecanolactam; the examples of the aminocarboxylic acid of the polymer (2) is ω-aminocaproic acid, ω-aminoenanthic acid, ω-aminocaprylic acid, ω-aminopelargonic acid, ω-aminocapric acid, 11-aminoundecanoic acid and 12-aminododecanoic acid; examples of the dicarboxylic acid of the polymer (3) are adipic acid, azelaic acid, sebacic acid, undecane diacid, dodecane diacid and isophthalic acid; and the examples of the diamine are hexamethylenediamine, heptamethylenediamine, octamethylenediamine and decamethylene-diamine. Two or more of the above amide-forming monomers may be used in combination. Preferable monomers among the above examples include caprolactam, 12-aminododecanoic acid and adipic acid-hexamethylenediamine, especially preferably caprolactam.

The polyamide may be produced by ring-opening polymerization or polycondensation of the above amide-forming monomer by conventional method in the presence of a dicarboxylic acid component having a carbon number from 4 to 20 as a molecular weight controlling agent. Examples of the dicarboxylic acid having a carbon number from 4 to 20 are aliphatic dicarboxylic acids such as succinic acid, glutaric acid, adipic acid, pimelic acid, suberic acid, azelaic acid, sebacic acid, undecane diacid and dodecane diacid; aromatic dicarboxylic acids such as terephthalic acid, isophthalic acid, phthalic acid and naphthalenedicarboxylic acid; alicyclic dicarboxylic acids such as 1,4-cyclohexanedicarboxylic acid and dicyclohexyl-4,4'-dicarboxylic acid; and alkaline metal salts of 3-sulfoisophthalic acid such as sodium 3-sulfoisophthalate and potassium 3-sulfoisophthalate. Preferred acids include aliphatic dicarboxylic acids, aromatic dicarboxylic acids and alkaline metal salts of 3-sulfoisophthalic acid, and more preferred acids are adipic acid, sebacic acid, terephthalic acid, isophthalic acid and sodium 3-sulfoisophthalate.

The number-average molecular weight of the polyamide may be about 500 to 5,000, preferably 500 to 3,000.

Examples of the bisphenols of the alkylene oxide adduct of a bisphenol include bisphenol A (4,4'-dihydroxydiphenyl-2,2-propane), bisphenol F (4,4'-dihydroxydiphenylmethane), bisphenol S (4,4'-dihydroxydiphenylsulfone) and 4,4'-dihydroxydiphenyl-2,2-butane; and especially preferable compound among the above examples is bisphenol A. The alkylene oxides of the adduct include ethylene oxide, propylene oxide, 1,2- or 1,4-butylene oxide or a mixture of two or more of the above compounds. Ethylene oxide is preferable among the above examples.

The number-average molecular weight of the ethylene oxide adduct of bisphenol may be about 300 to 5,000, preferably 1,000 to 3,000, especially preferably 1,600 to 3,000. More preferably, the adduct has an ethylene oxide molar number of 30 to 60. The amount of the alkylene oxide adduct in the component may be preferably 20 to 80% by weight, more preferably 25 to 75% by weight of the copolymer.

The ion conducting polymer may be mixed into the polymeric resin by conventional means for forming resin compositions, for example melt mixing. The amount of ion conducting polymer used will vary with several factors, such as the final surface resistance desired, the inherent electrical conductivity of the ion conducting polymer, and what other ingredients are present in the overall composition. However about 5 to about 30 weight % of the ion conducting resin of the total of the resins present in the composition, including the ion conducting polymer, may be used.

The compositions may also optionally further comprise other additives such as about 0.5 to about 5 weight % plasticizer; about 0.1 to about 5 weight % antioxidants and stabilizers; about 3 to about 40 weight % fillers; about 5 to about 40 weight % reinforcing agents; about 0.5 to about 10 weight % nanocomposite reinforcing agents; and/or about 1 to about 40 weight % flame retardants, the weight % based on the weight of the entire composition, including the PHA, impact modifier, ion conducting polymer and additives. Examples of suitable fillers include glass fibers and minerals such as precipitated $CaCO_3$, talc, and wollastonite.

The composition may be prepared by melt blending the PHA, ethylene copolymer impact modifier and antistatic agent until they are homogeneously dispersed to the naked eye and do not delaminate upon processing, such as injection molding. Microscopic analysis of the compositions reveals small regions of the modifiers dispersed in the PHA matrix. Other materials may be also dispersed in the PHA-ethylene copolymer matrix. The blend may be obtained by combining the component materials using any melt-mixing method known in the art. For example: 1) the component materials may be mixed to apparent homogeneity using a melt-mixer such as a single or twin-screw extruder, blender, kneader, Banbury mixer, roll mixer, etc., to give a resin composition; or 2) a portion of the component materials may be mixed in a melt-mixer, and the rest of the component materials subsequently added and further melt-mixed until homogeneous.

Also disclosed is an article comprising or producing from the composition disclosed herein. The article may be a molded article, extruded article, thermoformed article, or combination of two or more thereof. The composition may be molded into articles using any suitable melt-processing technique. Commonly used melt-molding methods known in the art include injection molding, (co)extrusion molding, profile extrusion or blow molding. The compositions may be formed into films and sheets by extrusion, coextrusion, lamination, extrusion coating and the like to prepare both cast and blown films or sheets. These sheets may be further thermoformed into articles and structures that may be oriented from the melt or at a later stage in the processing of the composition. Multilayer structures may be prepared, comprising at least one layer of the composition described herein and at least one other layer, including other thermoplastic resins and non-thermoplastic substrates. The compositions may also be used to form fibers and filaments that optionally may be oriented from the melt or at a later stage in the processing of the composition.

Examples of articles that may be formed from the compositions include, but are not limited to, knobs, buttons, disposable eating utensils, films, thermoformable sheeting and the like. Parisons used in blow molding containers may be prepared by injection molding. Blow molded containers include bottles, jars and the like. Films and sheets can be used to prepare packaging materials and containers such as pouches, lidding, thermoformed containers such as trays, cups, and bowls. Other thermoformed packaging articles include blister packaging, blister components or pharmaceutical compartments for dispensers, clam shells, handling-trays, point-of-purchase display stands, two-pieces boxes (lid and base combinations), dispenser bodies, bifoldable articles, and the like.

EXAMPLES

Materials Used

PLA-1: melting point of about 165° C. available as NATUREWORKS LLC PLA 3001D.
EBAGMA-5: an ethylene/n-butyl acrylate/glycidyl methacrylate terpolymer derived from 66.75 wt % ethylene, 28 wt % n-butyl acrylate, and 5.25 wt % glycidyl methacrylate, melt index (MI) of 12 g/10 minutes.
EBAGMA-12: an ethylene/n-butyl acrylate/glycidyl methacrylate terpolymer derived from 66 wt % ethylene, 22 wt % n-butyl acrylate, and 12 wt % glycidyl methacrylate, MI of 8 g/10 minutes.
EBACO-1: an ethylene/n-butyl acrylate/carbon monoxide terpolymer (about 30 wt % of n-BA and about 10 wt % of CO, MI of 8 g/10 min).
EBA-1: an ethylene/n-butyl acrylate dipolymer (27 wt % n-BA, MI of 4 g/10 min).
EGMA-1: an ethylene/glycidyl methacrylate dipolymer with 3 wt % GMA, MI of 8 g/10 minutes, available commercially under the tradename BONDFAST® 7L from Sumitomo Chemical Company.
AS-1: a polyether ester amide with 300 ppm Na, available from Sanyo Chemical Industries as PELESTAT® 6321.
AS-2: a polyether ester amide with 3000 ppm Na, available from Sanyo Chemical Industries as PELESTAT® 6500.

MI was measured at 190° C. using a 2.16 kg weight according to ASTM method D1238 and ISO 1133.

Compositions of PLA-1, antistatic agent and EBAGMA modifier were prepared as summarized in Table 1. The components listed in Table 1 for the Examples were combined and fed to the rear of a ZSK 30 mm twin screw extruder and melt mixed using at a melt temperature of about 200° C. to yield a resin composition. Exiting the extruder, the composition was passed through a die to form strands that were cooled and solidified in a quench tank and subsequently chopped into pellets.

TABLE 1

| Example | PLA-1 | AS-1 | AS-2 | EBAGMA-12 | EBAGMA-5 |
|---------|-------|------|------|-----------|----------|
| C0  | 100 | 0  | 0  | 0  | 0  |
| C1  | 90  | 10 | 0  | 0  | 0  |
| 2   | 85  | 10 | 0  | 5  | 0  |
| 3   | 80  | 10 | 0  | 10 | 0  |
| 4   | 70  | 10 | 0  | 20 | 0  |
| 5   | 85  | 10 | 0  | 0  | 5  |
| 6   | 80  | 10 | 0  | 0  | 10 |
| 7   | 70  | 10 | 0  | 0  | 20 |
| C8  | 80  | 20 | 0  | 0  | 0  |
| 9   | 75  | 20 | 0  | 5  | 0  |
| 10  | 70  | 20 | 0  | 10 | 0  |
| 11  | 60  | 20 | 0  | 20 | 0  |
| C12 | 90  | 0  | 10 | 0  | 0  |
| 13  | 85  | 0  | 10 | 5  | 0  |
| 14  | 80  | 0  | 10 | 10 | 0  |
| 15  | 70  | 0  | 10 | 20 | 0  |
| C16 | 80  | 0  | 20 | 0  | 0  |
| 17  | 75  | 0  | 20 | 5  | 0  |
| 18  | 70  | 0  | 20 | 10 | 0  |
| 19  | 60  | 0  | 20 | 20 | 0  |
| C20 | 80  | 0  | 0  | 20 | 0  |

Sample Preparation

The pelletized compositions of the Examples and Comparative Examples of Table 1 were molded into test specimens. The extruded pellets were molded into 7.6 cm×12.7 cm×0.32 cm thick plaques and 4-mm thickness ISO all-purpose bars using a Nissei Japan 6-ounce injection molding machine, using a 190° C. cylinder setting and 50° C. mold temperature. The plaques were tested for dissipation voltage values (Volt), Half-dissipation time (sec), SDPI (V-mi.) according to the procedures discussed below. Mechanical properties such as tensile strength, elongation, and Notched Izod impact strength were measured with ISO all-purpose bars according to standard procedures.

Static Charge Dissipation

Surface Charge Decay

All samples were conditioned at 23° C. and 50% relative humidity (RH) for 48 hours prior to the testing. Surface charge decay data up to 60 seconds for the samples, measured at 23° C. and 50% RH, were obtained using a Static Honest Meter S-4104 (Shishido Shokai Co., Tokyo, Japan) after applying 10 kV of corona discharge for 1 minute. The Static Honest Meter is a measuring instrument for attenuation of static electricity. This device is used to electrify the specimens by irradiating with air ions generated by corona discharges initiated by the device, and then, after the irradiation is stopped, it is used to investigate the decay curve of the charge on the specimen. In the tests summarized in Table 2, static charges were recorded at 0, 1, 3, 10, 30 and 60 seconds after the corona treatment was stopped. Static charge dissipation data for the various PLA blends are shown in Table 2.

Half-Dissipation Time

Half-dissipation time is determined as the time for the surface charge to reach half of the initial surface charge. Commercially-available materials considered to have good antistatic performance may show half-dissipation time of less than 3 seconds. The static discharge data measured as described above was plotted and the time at which the dissipation curve reached half of its original value is the half-dissipation time. The half-dissipation time for the blends is shown in Table 2.

Static Decay Performance Index (SDPI)

M. Matsui and T. Kashiwamura (*Sen-I Gakkaishi*, 49, No.8 (1993)) proposed a concept of an index of frictional static charge dissipation to describe the antistatic performance more appropriately. It is the integral of the charge dissipation curve ($V=f(t)$) up to 1 minute after the applied friction, which is, in other words, the average static charge during 1 minute multiplied by 1 minute as described in the equation below. It is known that the dissipation speed decreases when the surface charge becomes small even for the same material. Therefore, half dissipation time tends to become larger when the initial surface charge of the material is low. Since good antistatic material tends to have lower initial surface charge with the same applied corona discharge, half dissipation time of the material does not always represent the antistatic performance appropriately, which sometimes makes it difficult to differentiate excellent antistatic material from others. This index is considered as a new method to describe the antistatic performance from the standpoint of both initial surface charge and decay curve. Using this method, materials with SDPI larger than about 1500 V-minute are insulating materials, materials with SDPI of about 300 to 600 V-minute exhibit good antistatic performance, materials with SDPI of about 100 to 300 V-minute are very good antistatic materials and materials with SDPI less than 100 V-minute are excellent antistatic materials. Other applications of the SDPI concept for describing static charge dissipation include T. Kobayashi, B. Wood, A. Takemura, H. Ono, *J. Electrostatics*, 64, 377 (2006) and T. Kobayashi, B. Wood, A. Takemura, H. Ono, *Polymer Engineering & Science*, 48, 2247(2008).

Unmodified PLA-1 (Comparative Example C0) has very poor antistatic performance, as indicated by its SDPI. Comparative Examples C1, C8, C12 and C16 show that addition of PEEA antistatic agents to PLA provides improved antistatic performance. As demonstrated by Comparative Examples C1 and C8, using low-sodium AS-1, an increase of PEEA content from 10% to 20% in PLA gave faster charge decay. However, the dissipation half-times were not fast enough for those materials to be considered "good." A binary blend of PLA/20% EBAGMA-12 (Comparative Example C20) showed no dissipation during the measured time of 60 seconds, so EBAGMA as a single additive provides no antistatic benefit. Considering there is no effect on static decay by adding EBAGMA to PLA, unexpected synergy was observed for the ternary blends of PLA, EBAGMA and antistatic agent, as demonstrated by comparing the half-dissipation times and SDPI of Examples 2-4 to that of Comparative Example C1. Surprisingly, the ternary blends provided better than expected static charge decay. A PLA composition containing 20% EBAGMA-12 and 10% AS-1 (Example 4) provided a similar dissipation curve to PLA/20% AS-1 (Comparative Example 8). In combination with the EBAGMA, less antistatic agent can be used to obtain the same antistatic performance. Examples 5, 6 and 7 show that addition of EBAGMA-5 also provides faster charge decay than C1, but it is less effective as using copolymers with higher amounts of GMA in the copolymer.

Higher levels of sodium ions in the antistatic modifier provided better charge decay (Comparative Examples C12 and C16). About 20% of high sodium PEEA (AS-2) is needed to achieve practically useful antistatic performance. Addition of 5% of EBAGMA-12 to PLA/20% AS-1 (Example 9) provided a similar half-dissipation time to PLA/20% AS-2 (C16), again demonstrating unexpected synergy. Use of a small amount of EBAGMA allows for the use of low sodium

TABLE 2

$$V = f(t)$$

$$SDPI = \int_0^1 f(t)dt$$

| | Static charge at time indicated (volts) | | | | | | Half-dissipation | SDPI |
|---|---|---|---|---|---|---|---|---|
| Time (sec) | 0 | 1 | 3 | 10 | 30 | 60 | time (sec) | (Volt · minute) |
| Example | | | | | | | | |
| C0 | — | — | — | — | — | — | — | 2072 |
| C1 | 2020 | 1950 | 1790 | 1490 | 1130 | 880 | 42.8 | 1226 |
| 2 | 2030 | 1920 | 1770 | 1410 | 980 | 720 | 27.3 | 1103 |
| 3 | 1900 | 1720 | 1400 | 930 | 520 | 320 | 9.8 | 670 |
| 4 | 1900 | 1630 | 1370 | 870 | 420 | 220 | 8 | 585 |
| 5 | 2070 | 1970 | 1820 | 1480 | 1050 | 770 | 32.3 | 1166 |
| 6 | 2020 | 1920 | 1720 | 1350 | 930 | 650 | 24.3 | 1048 |
| 7 | 2000 | 1850 | 1560 | 1080 | 620 | 380 | 12 | 776 |
| C8 | 1880 | 1650 | 1330 | 790 | 400 | 230 | 7 | 559 |
| 9 | 1750 | 1400 | 950 | 440 | 150 | 60 | 3.8 | 297 |
| 10 | 1530 | 1170 | 500 | 120 | 30 | 0 | 2 | 119 |
| 11 | 1500 | 1120 | 500 | 80 | 30 | 0 | 2 | 109 |
| C12 | 1820 | 1620 | 1280 | 800 | 410 | 250 | 7.7 | 403 |
| 13 | 1700 | 1430 | 1060 | 560 | 250 | 130 | 4.7 | 392 |
| 14 | 1580 | 1250 | 750 | 280 | 80 | 40 | 2.7 | 207 |
| 15 | 1420 | 1040 | 530 | 170 | 40 | 0 | 2 | 133 |
| C16 | 1580 | 1330 | 870 | 400 | 150 | 70 | 3.7 | 282 |
| 17 | 1100 | 700 | 270 | 50 | 30 | 0 | 1.7 | 71 |
| 18 | 970 | 550 | 130 | 30 | 0 | 0 | 1.2 | 38 |
| 19 | 500 | 200 | 40 | 10 | 0 | 0 | 1 | 14 |
| C20 | 2120 | 2120 | 2120 | 2110 | 2080 | 2050 | >120 | 2084 | antistatic agent to obtain antistatic performance similar to that obtained using the high-sodium agent without EBAGMA. Examples 14 and 15, with 10 weight % of AS-2 in combination with 10 or 20 weight % of EBAGMA-12, provided better antistatic performance than Comparative Example C16 with 20 weight % AS-2 and no EMAGMA-12.

Ternary blends of PLA/20% AS-2 with EBAGMA-12 provided excellent charge decay and half-dissipation times. Those ternary blends also had significantly lower initial surface charge after applying corona discharge by Honest Meter for 1 min.

Mechanical Property Testing

The test pieces were also used to measure mechanical properties on samples as molded, at 23° C. and 50% relative humidity. Tensile strength and elongation at break were measured according to the procedure of ISO 527-1/2. Notched Izod tests were conducted according to ASTM procedure D256 and ISO 180. The results are summarized in Table 3.

TABLE 3

|  | Tensile Strength (MPa) | Elongation at break (%) | Notched Izod (kJ/m$^2$) |
| --- | --- | --- | --- |
| C0 | 68.6 | 2.4 | 2.1 |
| C1 | 65.4 | 8.8 | 2.2 |
| 2 | 56.1 | 4.9 | 2.8 |
| 3 | 49.8 | 11.4 | 4.4 |
| 4 | 39.2 | 30.8 | 12.5 |
| 5 | 54.3 | 8.2 | 3.8 |
| 6 | 49.7 | 8.5 | 4.5 |
| 7 | 39.2 | 26.8 | 11.8 |
| C8 | 54.4 | 9.2 | 3.7 |
| 9 | 47.6 | 11.4 | 4.5 |
| 10 | 41.2 | 32 | 7.9 |
| 11 | 31.6 | 52.6 | 31.9 |
| C12 | 66.6 | 6.4 | 2.3 |
| 13 | 54.9 | 7.6 | 3.5 |
| 14 | 48.6 | 9.8 | 4.2 |
| 15 | 38.8 | 34.2 | 16.8 |
| C16 | 53.7 | 2.6 | 4.2 |
| 17 | 44.3 | 38.6 | 5 |
| 18 | 39 | 31.6 | 13.3 |
| 19 | 30 | 76.6 | 56.9 |
| C20 | 45.8 | 34.9 | 5.6 |

Unmodified PLA-1 (Comparative Example C0) has very poor toughness, as indicated by its Notched Izod value, and poor elongation at break. Inclusion of 10 weight % of AS-1 or AS-2 (Comparative Examples C1 and C12) had little effect on toughness and elongation. Addition of either EBAGMA-5 or EBAGMA-12 provided significant improvement in toughness. When 20 weight % of EBAGMA-12 was combined with either antistatic agent, the notched Izod of the ternary blend increased at least 2-fold over that of the binary blend C20. Together with the improved antistatic performance observed for these compositions, these results demonstrate that a good balance of antistatic performance and toughness is provided by these ternary blends that would not be predicted by the performance of the binary blends of PLA and either antistat or toughener. Compositions with 10-20 weight % antistatic agent and 10-20 weight % of EBAGMA have antistatic performance and toughening significantly greater than the corresponding values for the binary blends. Example 15 is notable for both excellent antistatic performance and excellent toughness.

Additional Examples were prepared using similar procedures as those described above with other ethylene copolymers, as summarized in Table 4.

TABLE 4

| Example | PLA | AS-1 | EBACO-1 | EBA-1 | EGMA-1 |
| --- | --- | --- | --- | --- | --- |
| C0 | 100 | 0 | 0 | 0 | 0 |
| C1 | 90 | 10 | 0 | 0 | 0 |
| 21 | 85 | 10 | 5 | 0 | 0 |
| 22 | 80 | 10 | 10 | 0 | 0 |
| 23 | 70 | 10 | 20 | 0 | 0 |
| 24 | 85 | 10 | 0 | 5 | 0 |
| 25 | 80 | 10 | 0 | 10 | 0 |
| 26 | 70 | 10 | 0 | 20 | 0 |
| 27 | 85 | 10 | 0 | 0 | 5 |
| 28 | 80 | 10 | 0 | 0 | 10 |

These compositions all used a low amount of the low-sodium antistatic agent. The compositions were molded into test articles and tested for physical properties and static charge dissipation as described above. The results are summarized in Table 5.

TABLE 5

| Example | Tensile Strength (MPa) | Elongation at break (%) | Notched Izod (kJ/m$^2$) | SDPI (Volt · min) |
| --- | --- | --- | --- | --- |
| C0 | 68.6 | 2.4 | 2.1 | 2072 |
| C1 | 65.4 | 8.8 | 2.2 | 1226 |
| 21 | 54 | 6.1 | 3.4 | 784 |
| 22 | 49 | 12.2 | 4.9 | 663 |
| 23 | 41 | 25.6 | 9.2 | 336 |
| 24 | 56 | 5.8 | 3.1 | 893 |
| 25 | 51 | 10.5 | 3.4 | 769 |
| 26 | 43 | 22.3 | 5.2 | 388 |
| 27 | 58 | 4.9 | 2.3 | 1180 |
| 28 | 49 | 9.9 | 3.3 | 720 |

None of the ethylene copolymers used in the compositions summarized in Table 4 are known to impart antistatic performance. Surprisingly, as summarized in Table 5, when used in combination with the antistatic agent AS-1, they all provided increased antistatic performance compared to the binary blend of PLA and AS-1 (C1). They provided similar improvement in antistatic performance as the corresponding EBAGMA-12 modified compositions of Examples 2-4. The compositions also exhibited increased toughness compared to C1.

PLA compositions with antistatic properties were obtained by blending with sodium-containing PEEA copolymer as an ion conductive phase. Adding ethylene copolymers such as EBAGMA provided unexpected increased antistatic performance. In addition to improved antistatic performance, the PLA compositions described herein exhibit improved toughness, as evidenced by Notched Izod tests.

The invention claimed is:

1. A composition comprising or produced from, based on the total weight of the composition, about 40 to about 94% of poly(hydroxyalkanoic acid), about 3 to about 30% of an impact modifier, and about 3 to about 30% of an ion conductive polymer wherein the impact modifier is an ethylene copolymer derived from copolymerizing ethylene, carbon monoxide, and a comonomer selected from the group consisting of glycidyl (meth)acrylate, alkyl (meth)acrylate, vinyl ester, and combinations thereof; and the ion conductive polymer is selected from the group consisting of polyamide/polyether block amide, polyether block amide, polyether ester amide, or combinations of two or more thereof, each comprising 10 to 5000 ppm, based on the weight of the ion conductive polymer of an alkali metal compound, alkaline earth metal compound, salt of the alkali metal compound, or salt of the alkali earth metal compound.

2. The composition of claim 1 wherein the poly(hydroxyalkanoic acid) is 6-hydroxyhexanoic acid, 3-hydroxyhexanoic acid, 4-hydroxyhexanoic acid 3-hydroxyheptanoic acid, or combinations of two or more thereof; and
the alkyl (meth)acrylate is selected from the group consisting of methyl acrylate, methyl methacrylate, ethyl acrylate, ethyl methacrylate, butyl acrylate, and butyl methacrylate, and combinations of two or more thereof.

3. The composition of claim 2 wherein the poly(hydroxyalkanoic acid) has five or fewer carbon atoms and the impact modifier is ethylene vinyl acetate carbon monoxide terpolymer, ethylene butyl acrylate carbon monoxide terpolymer, and combinations thereof.

4. The composition of claim 3 wherein the poly(hydroxyalkanoic acid) comprises glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, 5-hydroxyvaleric acid, or combinations of two or more thereof.

5. The composition of claim 4 wherein the poly(hydroxyalkanoic acid) comprises poly(glycolic acid, poly(lactic acid), polyhydroxy-butyric acid, polyhydroxybutyrate-hydroxyvalerate copolymer, copolymer of glycolic acid and lactic acid, or combinations of two or more thereof.

6. The composition of claim 5 wherein the poly(hydroxyalkanoic acid) is poly(lactic acid) and the impact modifier is the ethylene butyl acrylate carbon monoxide terpolymer.

7. The composition of claim 6 wherein the ion conducting polymer is the polyether ester amide.

8. The composition of claim 7 wherein the alkali metal compound or salt comprises sodium.

9. The composition of claim 8 wherein the impact modifier is present in about 10 to about 20 weight % and the ion conductive polymer is present in about 10 to about 20 weight %, of the composition.

10. The composition of claim 1 wherein the poly(hydroxyalkanoic acid) is poly(lactic acid); the ion conductive polymer comprises sodium; and the glycidyl (meth)acrylate present in the impact modifier is about 3 to about 25 weight % of the ethylene copolymer.

11. The composition of claim 10 wherein the impact modifier is ethylene butyl acrylate carbon monoxide terpolymer.

12. The composition of claim 8 wherein the alkyl (meth)acrylate present in the impact modifier is about 20 to about 35 weight %.

13. The composition of claim 12 wherein the glycidyl (meth)acrylate is glycidyl methacrylate and the alkyl (meth)acrylate is butyl acrylate.

14. The composition of claim 1 wherein the poly(hydroxyalkanoic acid) is poly(lactic acid); the ion conductive polymer comprises sodium; and the modifier is derived from ethylene, about 20 to about 35 wt % of the alkyl (meth)acrylate, and about 3 to about 20 wt % of the carbon monoxide.

15. The composition of claim 1 wherein the poly(hydroxyalkanoic acid) is poly(lactic acid); the ion conductive polymer comprises sodium; and the modifier is derived from ethylene, about 20 to about 35 weight % of the vinyl ester, and about 3 to about 20 wt % of the carbon monoxide.

16. An article comprising a composition wherein the article is a molded article, extruded article, thermoformed article, multilayer structure, or combination of two or more thereof and the composition is as recited in claim 1.

17. The article of claim 16 wherein the poly(hydroxyalkanoic acid) is poly(lactic acid); the impact modifier is selected from the group consisting of ethylene butyl acrylate carbon monoxide terpolymer, and ethylene vinyl acetate carbon monoxide terpolymer.

18. The article of claim 16 wherein the ion conducting polymer is the polyether ester amide.

19. The article of claim 18 wherein the article is the multilayer structure comprising at least one layer of the composition and at least one other layer comprising one or more thermoplastic resins, non-thermoplastic substrates, or both.

20. The article of claim 19 wherein the article is a molded article, film, sheet, fiber, or filament.

* * * * *